US012671734B2

(12) United States Patent
Trivedi et al.

(10) Patent No.: US 12,671,734 B2
(45) Date of Patent: Jun. 30, 2026

(54) DATA COLLECTION POLICY MANAGEMENT FOR VEHICLE SENSOR DATA

(71) Applicant: Atieva, Inc., Newark, CA (US)

(72) Inventors: Amiya Trivedi, Cupertino, CA (US); Raj Umashankar Gupta, San Jose, CA (US); Alok Kumar Sinha, Fremont, CA (US); Venkatesh Lakshmikanthan, Newark, CA (US)

(73) Assignee: Atieva, Inc., Newark, CA (US)

( * ) Notice: Subject to any disclaimer, the term of this patent is extended or adjusted under 35 U.S.C. 154(b) by 75 days.

(21) Appl. No.: 18/705,339

(22) PCT Filed: Oct. 27, 2022

(86) PCT No.: PCT/US2022/078809
§ 371 (c)(1),
(2) Date: Apr. 26, 2024

(87) PCT Pub. No.: WO2023/077020
PCT Pub. Date: May 4, 2023

(65) Prior Publication Data
US 2025/0227149 A1      Jul. 10, 2025

Related U.S. Application Data

(60) Provisional application No. 63/263,304, filed on Oct. 29, 2021.

(51) Int. Cl.
*H04L 67/12*      (2022.01)
*G06F 8/65*      (2018.01)
*G07C 5/00*      (2006.01)

(52) U.S. Cl.
CPC ................ *H04L 67/12* (2013.01); *G06F 8/65* (2013.01); *G07C 5/008* (2013.01)

(58) Field of Classification Search
CPC ........... H04L 67/12; G06F 8/65; G07C 5/008; H04W 4/38
See application file for complete search history.

(56) References Cited

U.S. PATENT DOCUMENTS 9,119,236 B1 * 8/2015 Martin ................... H04L 41/22
2016/0364921 A1 12/2016 Iyoda et al.
(Continued)

OTHER PUBLICATIONS

Extended European Search Report for European Application No. 22888507.5, mailed Mar. 13, 2025, 8 pages.
(Continued)

*Primary Examiner* — David R Lazaro
(74) *Attorney, Agent, or Firm* — Brake Hughes Bellermann LLP

(57) ABSTRACT

A policy file may be received at a vehicle outfitted with a plurality of sensors, the policy file governing a policy for capturing and uploading sensor data from at least one of the plurality of sensors characterizing a driving event of the vehicle. An over the air (OTA) update of a policy manager installed at the vehicle may be executed to install the policy file, the policy manager being configured to analyze the sensor data to detect and capture a subset of the sensor data related to the driving event, based on the policy file. The subset of the sensor data may be recorded in an event file, and the event file may be uploaded to the external network, based on the policy file. Consequently, it is possible to identify, transmit, and analyze driving events, while continuing to use sensor data for autonomous driving and control of a vehicle.

20 Claims, 5 Drawing Sheets

(56)         References Cited

U.S. PATENT DOCUMENTS

| 2016/0371077 A1 | 12/2016 | Moeller et al. | |
| 2017/0113664 A1* | 4/2017 | Nix | G07C 5/0891 |
| 2020/0364953 A1 | 11/2020 | Simoudis | |
| 2021/0192867 A1* | 6/2021 | Fang | G07C 5/0816 |
| 2023/0343146 A1* | 10/2023 | Jung | G07C 5/008 |
| 2025/0227149 A1* | 7/2025 | Trivedi | G06F 8/65 |

OTHER PUBLICATIONS

International Search Report and Written Opinion for PCT Application No. PCT/US2022/078809, mailed on Jan. 31, 2023, 10 pages.

* cited by examiner

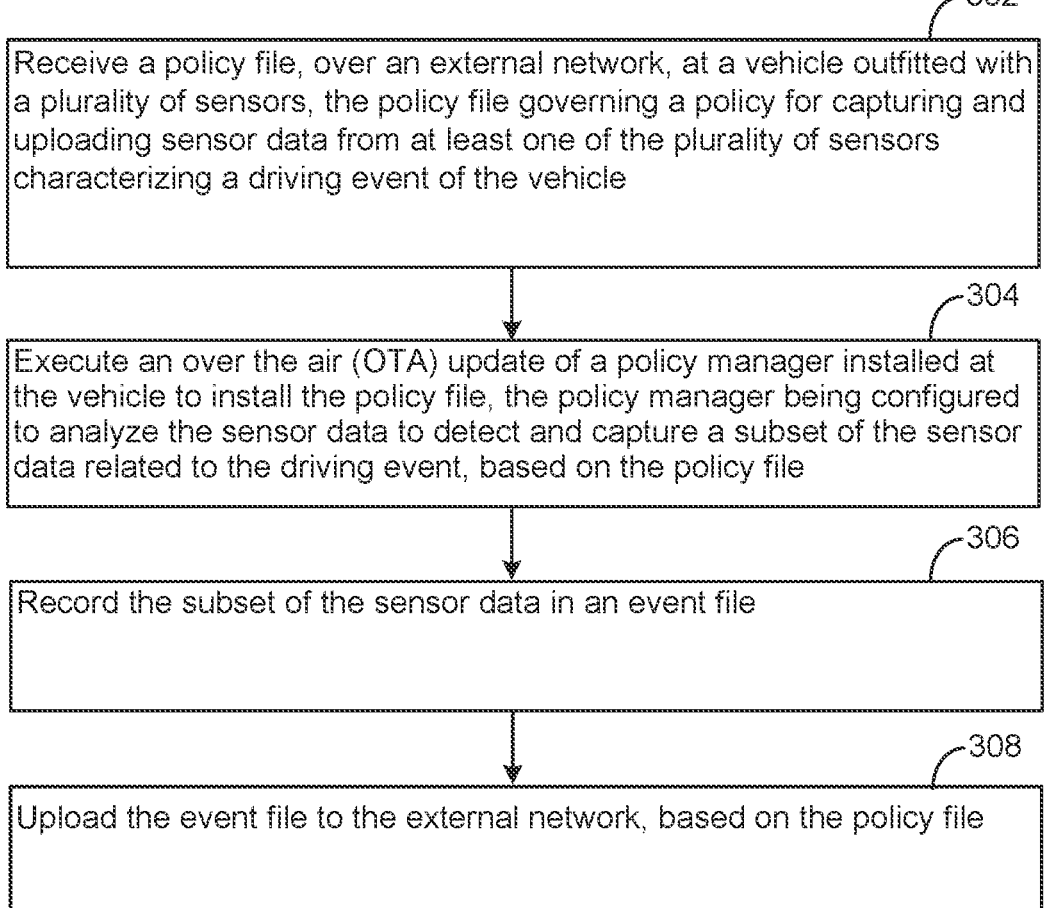

302

Receive a policy file, over an external network, at a vehicle outfitted with a plurality of sensors, the policy file governing a policy for capturing and uploading sensor data from at least one of the plurality of sensors characterizing a driving event of the vehicle

304

Execute an over the air (OTA) update of a policy manager installed at the vehicle to install the policy file, the policy manager being configured to analyze the sensor data to detect and capture a subset of the sensor data related to the driving event, based on the policy file

306

Record the subset of the sensor data in an event file

308

Upload the event file to the external network, based on the policy file

Determine policy change

504

Update policy file

506

Execute OTA update of policy file including ACU distribution from central ACU

508

Configure and implement policy manager using updated policy file

DATA COLLECTION POLICY MANAGEMENT FOR VEHICLE SENSOR DATA

CROSS-REFERENCE TO RELATED APPLICATION

This application is a 35 U.S.C. § 371 National Phase Entry Application from PCT Application No. PCT/US2022/078809, filed on Oct. 27, 2022, entitled "DATA COLLECTION POLICY MANAGEMENT FOR VEHICLE SENSOR DATA", and designating the U.S., which claims priority to U.S. Patent Application No. 63/263,304, filed on Oct. 29, 2021, and entitled "DATA COLLECTION POLICY MANAGEMENT FOR VEHICLE SENSOR DATA," the disclosures of which are incorporated by reference herein in their entireties.

TECHNICAL FIELD

This description relates to data collection from vehicle sensors.

BACKGROUND

Vehicles, such as automobiles, may acquire vast quantities of data related to operations of the vehicles. For example, vehicles may acquire data from multiple onboard sensors, as well as from external networks. Such data may be used, for example, to help ensure safe operation of a vehicle, and/or to facilitate semi-autonomous or autonomous driving of a vehicle.

Quantities of such data obtained at a vehicle may be extremely large, particularly relative to the computing resources available at the vehicle. It is possible to upload captured data to an external network for remote processing, but vehicle resources available for such uploading may also be limited.

Further, for purposes of ensuring safe and convenient operation of a vehicle, and/or to facilitating semi-autonomous or autonomous driving of a vehicle, it is important to process acquired data in a fast and efficient manner, notwithstanding the large volume of data in question. For example, if vehicle computing resources are consumed to provide sensor data processing and collection, then operations of the vehicle in collecting and processing future sensor data may be constrained, and/or user interactions with the vehicle may be delayed.

SUMMARY

According to some general aspects, a computer program product may be tangibly embodied on a non-transitory computer-readable storage medium and may comprise instructions that, when executed by at least one computing device, may be configured to cause the at least one computing device to receive a policy file, over an external network, at a vehicle outfitted with a plurality of sensors, the policy file governing a policy for capturing and uploading sensor data from at least one of the plurality of sensors characterizing a driving event of the vehicle. The instructions, when executed by at least one computing device, may be configured to cause the at least one computing device to execute an over the air (OTA) update of a policy manager installed at the vehicle to install the policy file, the policy manager being configured to analyze the sensor data to detect and capture a subset of the sensor data related to the driving event, based on the policy file. The instructions, when executed by at least one computing device, may be configured to cause the at least one computing device to record the subset of the sensor data in an event file, and upload the event file to the external network, based on the policy file.

In example implementations, the instructions, when executed by at least one computing device, may be configured to cause the at least one computing device to store the sensor data in at least one random access memory (RAM). The instructions, when executed by at least one computing device, may be configured to cause the at least one computing device to store the sensor data in a circular buffer having a maximum size, and delete oldest-stored sensor data from the circular buffer when the maximum size is reached and new sensor data is added. The instructions, when executed by at least one computing device, may be configured to cause the at least one computing device to detect a recording trigger, based on the policy file, that initiates recording of the subset of sensor data from the RAM to a second memory. The instructions, when executed by at least one computing device, may be configured to cause the at least one computing device to select, in response to the recording trigger and based on the policy file, at least one sensor from which to record the subset of sensor data, and designate a start time and end time of recording of the subset of sensor data. The instructions, when executed by at least one computing device, may be configured to cause the at least one computing device to designate the start time as occurring prior to the recording trigger, capture, from the RAM, a first portion of the subset of sensor data recorded prior to the recording trigger, and capture a second portion of the subset of sensor data recorded in the RAM after the recording trigger, until the end time is reached. The instructions, when executed by at least one computing device, may be configured to cause the at least one computing device to identify the recording trigger as including a sensor value of a first sensor of the plurality of sensors, identify, in response to the recording trigger and based on the policy file, at least a second sensor of the plurality of sensors, and include sensor data from the first sensor and the at least the second sensor within the subset of sensor data. The instructions, when executed by at least one computing device, may be configured to cause the at least one computing device to store first sensor data of a first sensor type from a first sensor at a first location within the RAM that is designated for the first sensor at a start of the vehicle, and store second sensor data of a second sensor type from a second sensor at a second location within the RAM that is designated for the second sensor type at the start of the vehicle. The instructions, when executed by at least one computing device, may be configured to cause the at least one computing device to classify the subset of sensor data as an event type, based on the policy file. The instructions, when executed by at least one computing device, may be configured to cause the at least one computing device to compress the subset of sensor data, based on the policy file, designate the compressed subset of sensor data within an upload queue, based on the policy file, and upload the compressed subset of sensor data to the external network, based on the upload queue.

According to some general aspects, a computer-implemented method may include receiving a policy file, over an external network, at a vehicle outfitted with a plurality of sensors, the policy file governing a policy for capturing and uploading sensor data from at least one of the plurality of sensors characterizing a driving event of the vehicle. The method may include executing an over the air (OTA) update of a policy manager installed at the vehicle to install the policy file, the policy manager being configured to analyze the sensor data to detect and capture a subset of the sensor data related to the driving event, based on the policy file. The method may include recording the subset of the sensor data in an event file, and uploading the event file to the external network, based on the policy file.

Example implementations may include storing the sensor data in at least one random access memory (RAM). Example implementations may include storing the sensor data in a circular buffer having a maximum size, and deleting oldest-stored sensor data from the circular buffer when the maximum size is reached and new sensor data is added. Example implementations may include detecting a recording trigger, based on the policy file, that initiates recording of the subset of sensor data from the RAM to a second memory. Example implementations may include selecting, in response to the recording trigger and based on the policy file, at least one sensor from which to record the subset of sensor data, and designating a start time and end time of recording of the subset of sensor data. Example implementations may include designating the start time as occurring prior to the recording trigger, capturing, from the RAM, a first portion of the subset of sensor data recorded prior to the recording trigger, and capturing a second portion of the subset of sensor data recorded in the RAM after the recording trigger, until the end time is reached. Example implementations may include identifying the recording trigger as including a sensor value of a first sensor of the plurality of sensors, identifying, in response to the recording trigger and based on the policy file, at least a second sensor of the plurality of sensors, and including sensor data from the first sensor and the at least the second sensor within the subset of sensor data.

According to some general aspects, a vehicle may include a chassis, a frame mounted on the chassis, a motor mounted within the frame, a plurality of sensors mounted on the vehicle, at least one memory including instructions, and at least one processor that is operably coupled to the at least one memory and that is arranged and configured to execute instructions. When executed, the instructions may cause the at least one processor to receive a policy file, over an external network, the policy file governing a policy for capturing and uploading sensor data from at least one of the plurality of sensors characterizing a driving event of the vehicle. When executed, the instructions may cause the at least one processor to execute an over the air (OTA) update of a policy manager installed at the vehicle to install the policy file, the policy manager being configured to analyze the sensor data to detect and capture a subset of the sensor data related to the driving event, based on the policy file. When executed, the instructions may cause the at least one processor to record the subset of the sensor data in an event file, and upload the event file to the external network, based on the policy file.

In example implementations, the instructions, when executed by the at least one processor, may cause the at least one processor to detect a recording trigger, based on the policy file, that initiates recording of the subset of sensor data from a random access memory (RAM) to a second memory, select, in response to the recording trigger and based on the policy file, at least one sensor from which to record the subset of sensor data, and designate a start time and end time of recording of the subset of sensor data. In example implementations, the instructions, when executed by the at least one processor, may cause the at least one processor to designate the start time as occurring prior to the recording trigger, capture, from the RAM, a first portion of the subset of sensor data recorded prior to the recording trigger, and capture a second portion of the subset of sensor data recorded in the RAM after the recording trigger, until the end time is reached.

The details of one or more implementations are set forth in the accompanying drawings and the description below. Other features will be apparent from the description and drawings, and from the claims.

BRIEF DESCRIPTION OF THE DRAWINGS

FIG. 3 is a flow chart illustrating example operations of the systems of FIGS. 1 and 2.

DETAILED DESCRIPTION

Described systems and techniques enable fast, accurate, and configurable collection of sensor data related to vehicle driving events of a vehicle. Consequently, it is possible to identify, transmit, and analyze desired subsets of sensor data related to driving events, while continuing to use the same sensor data for primary purposes, such as autonomous driving and control of a vehicle.

Moreover, described techniques enable the above and related features without disrupting or delaying user interactions with the vehicle. For example, users have many interactions with vehicle controls and interfaces, including, e.g., various applications for audiovisual entertainment, or global positioning system (GPS) navigation features. Such user interactions may be delayed if vehicle computing resources are consumed for purposes of sensor data collection and processing.

Further, it may be important to upload captured event data for remote processing. For example, such remote processing may enable improvements to vehicle control that reduce the chances of vehicle collisions or vehicle malfunctions. Upload resources at a vehicle may be limited or constrained; however, described techniques enable flexible, configurable, and cost-effective options for uploading captured event data.

In more detail, as referenced above, it is undesirable at best and infeasible at worst to store or transmit the vast quantities of sensor data collected by sensor-equipped vehicles, particularly considering computing resource constraints of onboard vehicle computing resources. Nonetheless, such sensor data contains potentially valuable information. For example, collected sensor data may be analyzed to improve an accuracy level of autonomous driving algorithms. Moreover, sensor data collected around a time of an accident or other driving event may be instrumental in predicting and avoiding accidents and other events in the future. Therefore, it is desirable to capture, transmit, and store minimally sufficient quantities (subsets) of sensor data that are likely to include such valuable information.

Described techniques determine and select event-related data that may be helpful in analyzing driving events and improving a self-driving ability of a vehicle, without disrupting ongoing processing of collected sensor data or concurrent user interactions with vehicle resources, and without requiring large or inefficient quantities of processing or memory resources. Additionally, the described techniques are highly-configurable through the use of over the air (OTA) updates to a lightweight policy manager using a modifiable policy file that is executable by the policy manager. Accordingly, the safety and convenience of vehicle drivers and other vehicle users may be enhanced.

Figure 1:
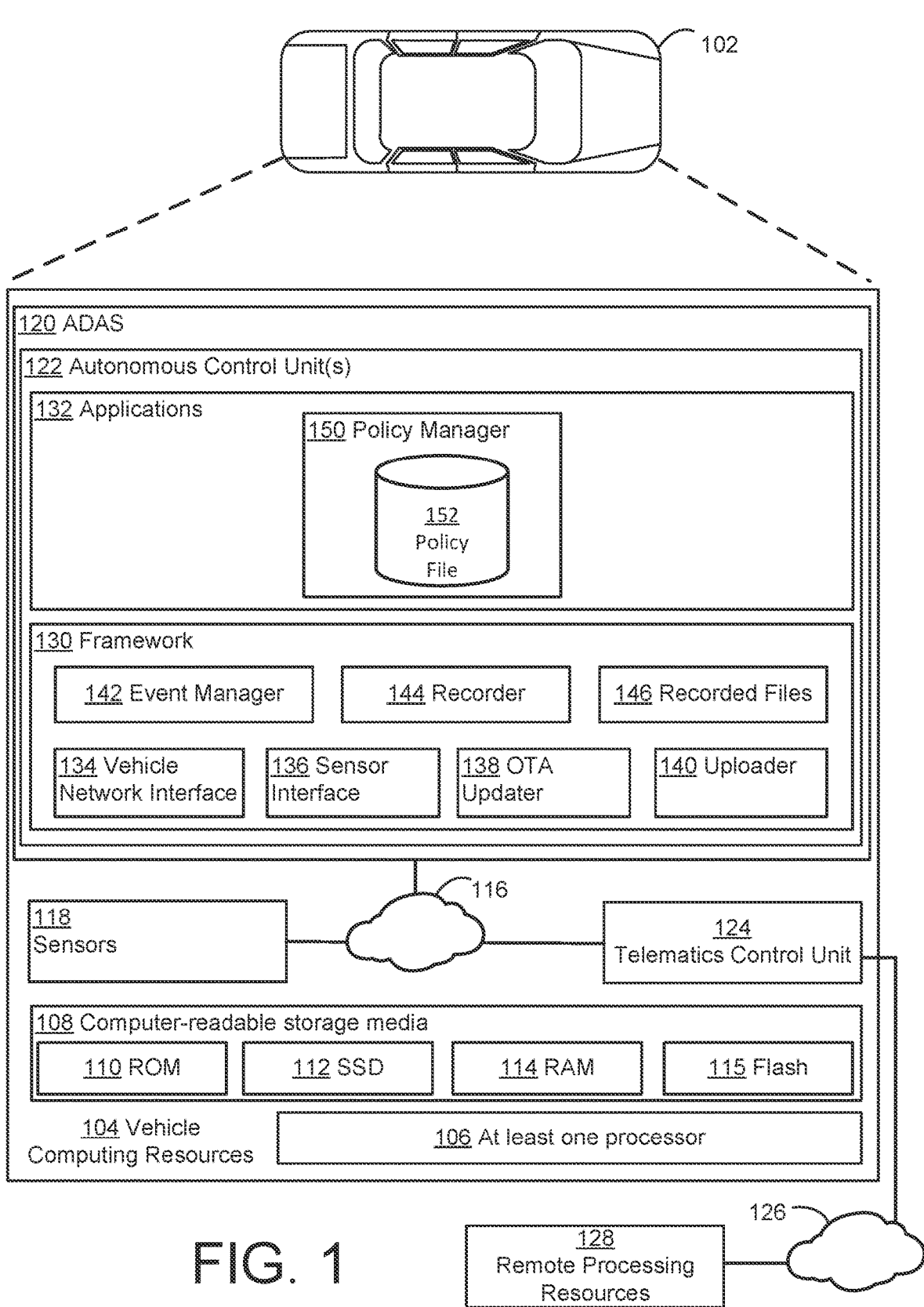
FIG. 1 is a block diagram of a system for sensor data policy management for collecting and processing driving events.

In the example of FIG. 1, a vehicle 102 is illustrated as a car, but should be understood to represent any type of automobile or automotive vehicle. In other example implementations, the vehicle 102 may represent any mobile, autonomous or semi-autonomous device, including, e.g., a robot, an airplane, a boat, or a drone.

The vehicle 102 may thus include a body of desired type (e.g., a chassis, a frame mounted on the chassis with doors, windows, a roof, trunk, and/or hood), various components for enabling movement of the vehicle, such as wheels/wings, and a suitable motor, such as an electric motor (and associated battery) or internal combustion engine (not separately illustrated in FIG. 1). Various types of vehicle computing resources 104, which may include many different types and configurations of hardware and software resources, may also be included. In the simplified example of FIG. 1, the vehicle computing resources 104 are illustrated as including at least one processor 106, and non-transitory computer-readable storage medium 108.

For example, the at least one processor 106 may represent multiple processors, chipsets, or processing cores. The computer-readable storage medium 108 may represent multiple types of memories, including, e.g., read-only memories (ROM) 110, solid state drives (SSD) 112, random access memories (RAM) 114, or flash memories (Flash) 115.

The vehicle computational resources 104 may also include network hardware used to create a vehicle network 116 within the vehicle 102. For example, the vehicle network 116 may represent, e.g., wiring and related hardware/software to provide one or more busses and related protocols for distributing data within the vehicle 102. As such, the vehicle network 116 provides opportunities for intra-vehicle communication between and among various vehicle subsystems, as described in detail, below.

For example, the vehicle network 116 may utilize existing types of vehicle bus topologies and related busses, including, e.g., the Controller Area Network (CAN) bus, the Local Interconnect Network (LIN) bus, or the Media Oriented Systems Transport (MOST). The network 116 may also represent automotive-grade Ethernet and various types of Transport Control Protocol/Internet Protocol (TCP/IP) networks.

In some implementations, two or more of these technologies may be combined or utilized together. For example, a physical Ethernet connection may be established throughout the vehicle 102 (e.g., as an Ethernet ring that encircles a chassis and/or cabin of the vehicle 102), and may be used to aggregate or distribute multiple CAN busses.

In many implementations, the vehicle 102 may include multiple sensors 118, which may be used to detect information regarding an environment or surroundings of the vehicle 102. For example, the sensors 118 may include video cameras, Light Detection and Ranging (lidar) sensors, ultrasonic sensors, radar sensors, GPS sensors, and various other types of sensors. The sensors 118 may be distributed within and around a chassis, body, and/or cabin of the vehicle 102, where needed to perform intended functions.

In the simplified example of FIG. 1, the vehicle computational resources 104, including the at least one processor 106, the non-transitory computer-readable storage medium 108, the vehicle network 116, and the sensors 118, are illustrated together for ease of illustration and description. Within the vehicle 102, however, as already noted with respect to the vehicle network 116 and the sensors 118, multiple pairs or groups of processors and memories may be distributed in desired locations within the vehicle 102, together with other related hardware, to provide intended functionalities.

For example, multiple control boards may be assembled using desired ones of the at least one processor 106 and the computer-readable storage media 108, and positioned appropriately within the vehicle 102 to perform desired functions. Such control boards and related hardware and software may be referred to generally as electronic control units (ECUs). For example, one or more ECUs may be used to support and enable corresponding vehicle subsystems. Examples of current vehicle subsystems may include subsystems for navigation, including an advanced driver assistance system (ADAS) 120 for autonomous or semi-autonomous systems, which may include one or more Autonomous Control Units (ACUs) 122. Various other vehicle subsystems may relate to, or include, subsystems for vehicle safety features, climate control, and information/entertainment (infotainment) systems.

In some implementations, the ACU 122 may represent two or more ACUs, e.g., three ACUs. In such cases, one of the ACUs may be designated as a central ACU of the ADAS 120. Then, communications between various ACU components of the several ACUs may be centralized and coordinated to a desired extent through the central ACU, which may be in communication with the remaining ACUs through the vehicle network 116.

Another example of an ECU is illustrated in FIG. 1 as telematics control unit (TCU) 124. The TCU 124 may represent a single site of network connectivity for connecting the vehicle 102 to external network(s) 126. Maintaining the TCU 124 as a single site of network connectivity may provide efficiency by reducing or eliminating a need to reproduce connectivity components (e.g., hardware modems) at multiple locations, or for multiple vehicle subsystems, within the vehicle 102.

Moreover, maintaining a single site of network connectivity may assist in protecting the vehicle 102 from various types of cyberattacks. For example, the TCU 124 may be equipped with firewalls and various other protection mechanisms used to prevent attackers from, e.g., controlling operations or the vehicle 102, or accessing confidential information within the vehicle 102.

The TCU 124 may include multiple modems and/or related hardware (including appropriate ones of the at least one processor 106 and the computer-readable storage media 108) for connecting to two or more external networks 126. For example, the TCU 124 may provide external connectivity to WiFi networks, long term evolution (LTE) networks, or 3G/4G/5G networks.

Accordingly, it is possible to use the external networks 126 to exchange vehicle information with remote processing resources 128. For example, as described in detail, below, it is possible to perform over-the-air (OTA) updates of software stored using the computer-readable storage media 108, or to upload navigation data from the vehicle 102 to the remote processing resources 128 for analysis or long-term storage.

As further illustrated, the ACU 122 may include a framework 130. The framework may include an operating system (OS) that, e.g., supports operations of one or more applications 132 of the ACU 122, and that enables connectivity with the vehicle network 116. For example, the framework 130 may provide or include an implementation of the Automotive Open Source Architecture (Autosar), which is designed to support deployment of the applications 132 using an operating system based on the Portable OS Interface (POSIX) standard, which is written using C++ and enables service-oriented communication and application programming interfaces (APIs) for communicating with, e.g., the vehicle network 116 and the applications 132. Additionally, or alternatively, the framework 130 may include other OS implementations, such as automotive grade Linux.

In the example of FIG. 1, the framework 130 is illustrated as including a vehicle network interface 134 for communicating with the vehicle network 116. The framework 130 also includes a sensor interface 136, which represents one or more interfaces for obtaining sensor data from the appropriate ones of the sensors 118.

An OTA updater 138 represents a component for receiving updates of the vehicle 102 via the external networks 126. For example, new or updated software may be downloaded via the TCU 124 and installed by the OTA updater 138 within an appropriate or designated memory of the computer-readable storage media 108.

An uploader 140 may be configured to execute any desired transmission of data from the vehicle 102 to the external networks 126, using the vehicle network 116 and the TCU 124. For example, the uploader 140 may be configured to upload processed sensor data, or any vehicle data, to the remote processing resources 128.

An event manager 142 represents a component for detecting, determining, processing, and/or characterizing network data received via the vehicle network interface 134 and/or sensor data received via the sensor interface 136, and for then using the network data and/or sensor data, e.g., to control other functions of the framework 130 and the applications 132. Put another way, the event manager 140 represents a control node for controlling and coordinating operations of the framework 130 and the applications 132, to thereby achieve coordinated functions such as, e.g., sensor fusion, multi-layer perception processing algorithms, and autonomous driving control algorithms for controlling steering, braking, or other functions of the vehicle 102.

In specific examples, the event manager 142 may be configured to control operations of a recorder 144 in recording various types of vehicle data, including sensor data, for storage as recorded files 146. For example, the recorded files 146 may be used to store sensor data related to particular events, including driving-related events such as sudden accelerations/decelerations, or impact events including collisions of the vehicle 102. Then, some or all of the recorded files 146 may be uploaded to the external networks 126, and to the remote processing resources 128, using the uploader 140.

In the simplified example of FIG. 1, the various components or modules 134, 136, 138, 140, 142, 144, 146 of the framework 130 are illustrated as singular, individual modules implemented entirely in the context of the framework 130. In various implementations, however, it will be appreciated that specific features and functions of one or more of the framework modules 134, 136, 138, 140, 142, 144, 146 may be implemented in the context of the applications 132, i.e., as application-layer functions.

For example, policies of the event manager 142 in defining and controlling sensor events processed by one or more application(s) 132 and recorded by the recorder 144 for uploading by the uploader 140 may be partially or completely governed or implemented at the application layer of the applications 132, using a policy manager 150 that is configured to execute a policy file 152. For example, the policy file 152 may be updateable using the OTA updater 138, so that changes in policy management may be updated on the fly, in a dynamic manner, and without consuming undesired quantities of valuable network bandwidth of the external network 126.

For example, as described in detail below with respect to FIGS. 2-5, the policy manager 150 may control relevant operations of the event manager 142, the recorder 144, and the uploader 140, based on a current implementation of the policy file 152. In so doing, in some examples, the policy manager 150 may represent a discrete application layer software module that is configured to interface with each of the event manager 142, the recorder 144, and the uploader 140, In similar implementations, relevant operations of the policy manager 150 may be implemented within each of the event manager 142, the recorder 144, and the uploader 140.

In any such scenarios, however, and related scenarios, the policy file 152 provides a lightweight file that may be easily updated using the OTA updater 138, whenever a change in event data collection processes is desired. In contrast, the event manager 142, the recorder 144, and/or the uploader 140 may represent relatively large binary files or libraries that are configured to implement many other functions, some of which are referenced above, besides the event data collection functions implemented by the policy manager 150.

Therefore, such modules may be problematic to modify or to perform OTA updates. For example, such updates may take undesirably long quantities of time, consume large quantities of network bandwidth, and/or be prone to causing errors in other functions of the updated libraries.

As referenced above, sensor data may be used for vehicle control as part of the ADAS 120. For example, processed sensor data may be routed through the vehicle network interface 134 and over the vehicle network 116 to an appropriate ECU for vehicle control. For example, such vehicle control may include steering or braking of the vehicle 102. Accordingly, processed sensor data and related data represents an extremely large volume of high priority data, which must be transmitted and processed quickly and accurately to maintain safe operation of the vehicle 102.

Nonetheless, much of this processed sensor data cannot, or should not, be transmitted or stored for long term use. In particular, quantities of local storage at the computer-readable storage media 108 may be very limited, while quantities of processed sensor data, including perception data (related to correctly perceiving a surrounding environment of the vehicle 102) and vehicle control data, may be generated continuously in vast quantities.

Moreover, there may be little need or motivation to attempt to store much or all of the vehicle control data. For example, the vehicle 102 may travel for a period of time uneventfully, with all sensor and control functionalities occurring as expected. Further, the vehicle 102 may travel for many hours, and the vehicle 102 may represent a fleet of many thousands of vehicles, so that it would be impractical, impossible, and undesirable to attempt to store such data either locally at the vehicle 102 and/or using the remote processing resources 128. Still further, attempting to store and analyze large or continuous quantities of vehicle sensor and control data may increase a likelihood of identifying the vehicle 102 uniquely, and thereby compromising a privacy of a user of the vehicle 102.

On the other hand, capturing important and meaningful vehicle events that may occur during use of the vehicle 102 may represent critical opportunities to improve relevant sensor and control (e.g., navigation) algorithms. For example, such event-specific vehicle data may represent, or correspond to, malfunctions or crashes of the vehicle 102.

Other events may relate to unexpected or undesirable driving conditions, such as sudden turns, accelerations, or decelerations. Such events may be correlated with, or caused by, external events, such as hazardous road conditions. In other examples, such events may be cause by driver error or distraction.

By capturing sensor and control data related to such events, the ADAS 120 enables fast, efficient, cost-effective analysis of operations of the vehicle 102, without overwhelming available resources for data storage, transmission, and analysis. As a result, it is possible to continuously improve the vehicle 102, including improvements to vehicle self-navigation and safety of users of the vehicle 102.

Figure 2:
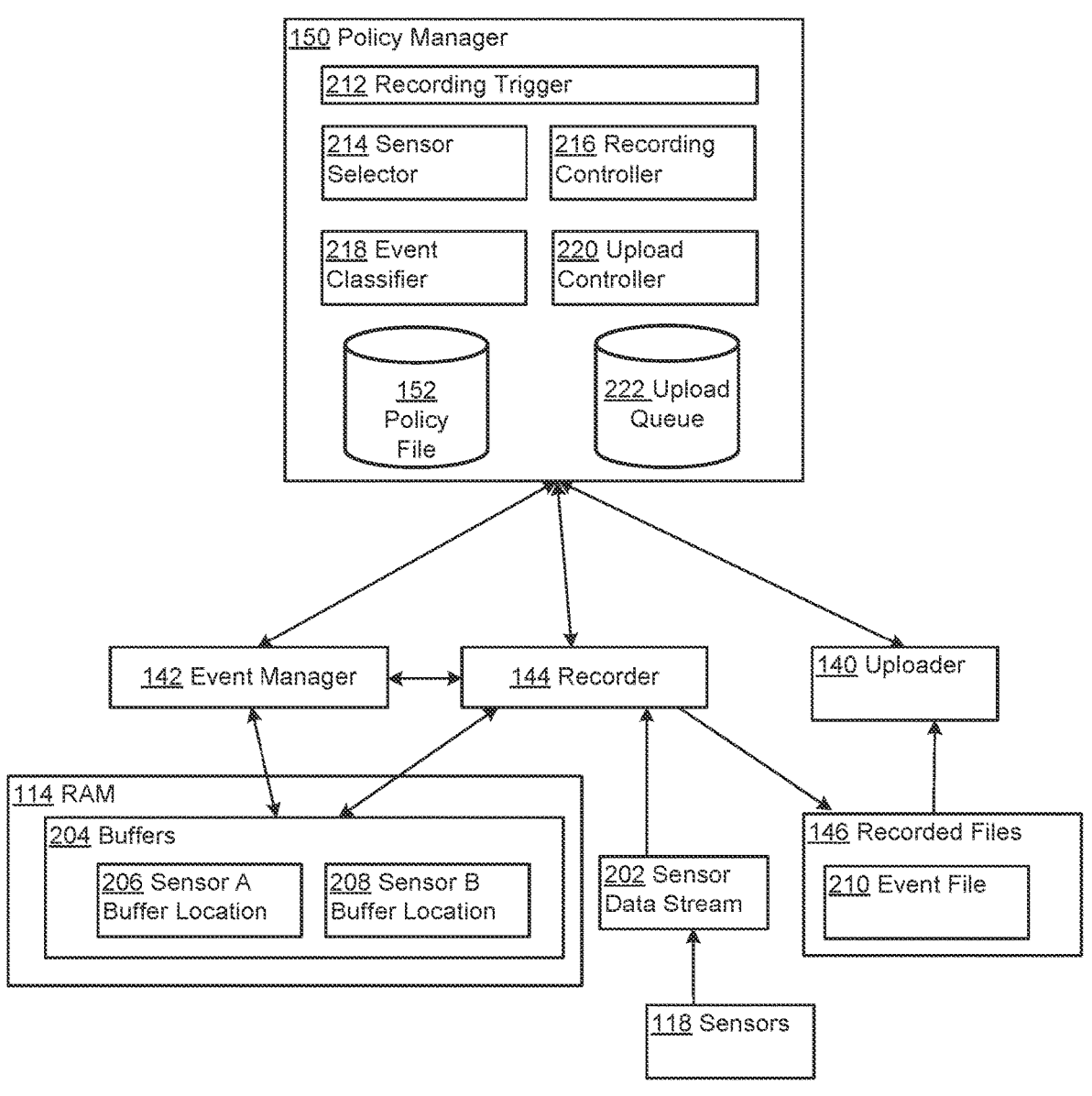
FIG. 2 is a block diagram illustrating a more detailed example of the system of FIG. 1.

As shown in FIG. 2, a sensor data stream 202 may be received from the sensors 118 and, as referenced above, captured at the recorder 144. In FIG. 2, the sensor data stream 202 may be captured at a buffer 204. For example, the buffer 204 may be implemented within, or using, the RAM 114. For example, sensor data may be continuously buffered at the buffer 204 throughout most or all driving or other operation of the vehicle 102.

In particular, as shown in FIG. 2, the buffer 204 may be assigned specific address spaces for specific sensors. For example, a sensor location 206 may be allocated to data from a first sensor, sensor A, while a sensor location 208 may be allocated to data from a second sensor, sensor B. Of course, as described above, the vehicle 102 may use many sensors, so that it will be appreciated that the buffer 204 may include corresponding memory locations for all such sensors. Sensor locations may be allocated, for example, in conjunction with a start or boot operation of the vehicle 102 and/or of the ADAS 120.

Based on operations of the policy manager 150, the event manager 142 and the recorder 144 may be configured to identify, collect, and classify specific sensor data from the buffer 204 that may be related to a specific driving event. Resulting event data may be recorded as an event file 210 within the recorded files 146, and subsequently uploaded to the remote processing resources 128 using the uploader 140.

In more detail, the policy manager 150 may include a recording trigger 212, which may be configured, based on the current contents of the policy file 152, to analyze the flow of sensor data stream 202 for the plurality of sensors, e.g., as buffered in the buffer 204, and identify a potential driving event for which event data should be captured. For example, a recording trigger may include unexpected or unpredicted sensor data in the sensor data stream 202.

Once such a recording trigger is identified, a sensor selector 214 may be configured to select data from corresponding sensors from the buffer 204, e.g., from corresponding ones of the various sensor locations represented by the sensor locations 206, 208.

For example, the vehicle 102 may include multiple cameras positioned at different locations on and around the vehicle 102, as well as multiple lidar sensors positioned at various other vehicle locations. Therefore, if an event recording trigger is identified in a first camera at a first portion on the vehicle 102 (e.g., at a right front corner of the vehicle 102), then the sensor selector 214 may be configured, based on the current contents of the policy file 152, to identify the camera in question and its corresponding sensor location (e.g., 206) within the buffer 204.

Moreover, the policy file 152 may specify that sensor data from at least one other sensor should be captured in conjunction with event data from the identified camera. For example, a lidar sensor that is positioned at a front of the vehicle 102 may be identified for concurrent collection of lidar sensor data. Then, the sensor selector 214 may be configured to identify a second location (e.g., 208) within the buffer 204, corresponding to the lidar sensor.

In contrast, various other ones of the sensors 118 (e.g., sensors at a rear of the vehicle 102) may be determined to be unlikely to be relevant to the current event. Therefore, sensor data from such sensors in a relevant time frame of the current event may not be identified for collection for the current event.

The sensor selector 214 may be configured by the policy file 152 to make event-specific determinations as to potential relevance of various sensors, and associated sensor data capture. For example, in the above example, the sensor data from the rear sensors may be collected for a first type of event associated with the right-front camera, but not for a second type of event associated with the right-front camera.

A recording controller 216 may be configured to control operations of the recorder 144 in recording event data from identified sensors (and sensor locations) from within the buffer 204. For example, the recording controller 216 may control a duration (e.g., length of time) of sensor data extracted from the buffer 204 for the event in question.

For example, the buffer 204 may continuously capture specified buffer durations of sensor data from the sensor data stream 202. For example, the buffer 204 may continuously capture a number of minutes of sensor data, such as two minutes, or five minutes. Then, for a specific type of event, the recording controller 216 may cause the recorder 144 to record a subset of the buffered sensor data, such as a preceding sixty seconds of buffered sensor data together with a subsequent sixty seconds of buffered sensor data that is collected in the sixty seconds following event identification/triggering.

An event classifier 218 may be configured to classify the event and associated subset of sensor data collected. For example, the recording trigger 212 may be configured to collect sensor data that may be associated with multiple types of events, based on a single trigger. For example, a trigger of a sudden braking event might be associated with distracted driving, an actual collision, or both.

The event classifier 218 may execute an event classification of recorded event data once recording controlled by the recording controller 216 is completed, e.g., once sensor data of the event file is completely captured. Event classification may be executed with respect to external events, such as a weather at the time of the event. Then, the event classification may be included in the event file 210. In some implementations, event classification may be conducted partially or completely at the remote processing resources 128.

For example, event data may include information regarding internally monitored vehicle components or systems, such as brakes, steering, or tire pressure. In other examples, the event data may include externally-obtained information, e.g., via the external network(s) 126. For example, the event data may include GPS data, or weather conditions.

An upload controller 220 may be configured to control a timing, manner, and priority of an upload operation of the event file 210, relative to other event files and other data in generally that may need to be uploaded by the uploader 140. For example, based on the policy file 152, the upload controller 220 may determine a relative priority of the event file with respect to other event files within an upload queue 222. Relative priority levels may determine, e.g., an order of files within the upload queue 222.

In other examples, priority levels may determine permissible network options for conducting the upload. For example, as described with respect to the TCU 124, the TCU 124 may include multiple modems for connecting to multiple types of networks. Such networks may have different transfer rates and associated costs. Consequently, the upload controller 220 may be configured to enable use of faster and/or more expensive external networks 126 for relatively higher priority event files being uploaded.

For example, in the event of a crash, a priority may be assigned that enables immediate (or as soon as possible) event file uploading using the fastest and most expensive network option, in order to ensure a safety of vehicle occupants, or because the crash may have the potential to render the uploader 140 or the TCU 124 inoperable. On the other hand, some events related to sudden acceleration/deceleration may be assigned a low priority, and may only be uploaded when a low cost external network is available.

Advantageously in the example of FIGS. 1 and 2, the various features and functions of the policy manager 150 may be modified on a configurable, dynamic basis, by performing an OTA update of the policy file 152. For example, triggers recognized by the recording trigger 212 may be added, removed, or modified. Sensors selected by the sensor selector 214 in conjunction with a suspected event may similarly be updated as-needed.

A duration of event recording performed by the recording controller 216, and the corresponding quantity or subset of event-specific sensor data captured, are also configurable simply by performing an OTA update of the policy file 152. For example, if the remote processing resources 128 analyze the event file 210 at a first time and determines that +/−60 seconds was an insufficient duration of sensor data collection, then the policy file 152 may subsequently be updated to cause the recording controller 216 to record additional sensor data.

The recording controller 216 may also be modified to control a format or manner of recording of different types of recorded sensor data. For example, the recording controller 216 may determine one of multiple video formats for recording a video stream from a camera. In other examples, the recording controller 216 may control a type and extent of compression (e.g., different compression algorithms that may be used) of the event file for efficient storage in the recorded file 146 and subsequent uploading by the uploader 140.

In the above examples, the buffer 204 is described as being implemented in RAM, which may reduce CPU demands that may occur, for example, if the sensor data stream 202 were buffered or recorded using the SSD 112, external hard drive, or other memory that requires CPU commands to write and delete data. Such CPU demands might otherwise result in reductions in responsiveness of other applications that rely on the same CPU(s), thereby causing user inconvenience and frustration, as referenced above. By directly processing the sensor data stream 202 using RAM, the buffer 204, the recorded sensor data may be accessed very quickly, with minimal CPU usage, and with minimal processing of the buffered data.

FIG. 3 is a flowchart illustrating example operations of the systems of FIGS. 1 and 2. In the example of FIG. 3, operations 302-308 are illustrated as separate, sequential operations. In various implementations, the operations 302-308 may include sub-operations, may be performed in a different order, may include alternative or additional operations, or may omit one or more operations. Further, in all such implementations, included operations may be performed in an iterative, looped, nested, or branched fashion.

In FIG. 3, a policy file may be received, over an external network, at a vehicle outfitted with a plurality of sensors. The policy file may govern a policy for capturing and uploading sensor data from at least one of the plurality of sensors characterizing a driving event of the vehicle (302). For example, the policy file 152 may be received at the TCU 124 of the vehicle 102 of FIG. 1. The policy file 152 may represent an entire policy file to be executed by the policy manager 150, or a delta update including only changes to the existing policy file.

An over the air (OTA) update of a policy manager installed at the vehicle may be executed to install the policy file, the policy manager being configured to analyze the sensor data to detect and capture a subset of the sensor data related to the driving event, based on the policy file (304). For example, the OTA updater 138 may be configured to download and install the policy file 152 at a central ACU 122 of a plurality of ACUs 122, which may then distribute the policy file 152 (or relevant portions thereof) to remaining ACUs 122. As shown in FIG. 2, the policy manager 150 may be implemented as a distributed component within one or more of the event manager 142, the recorder 144, and/or the uploader 140.

The subset of the sensor data may be recorded in an event file (306). For example, the recorder 144 may have a recording trigger specified by the policy file 152, which may be triggered by one or both of the sensor data stream 202 and/or the event manager 142. The resulting recorded subset of the sensor data may be obtained from relevant sensors by accessing relevant locations within the buffers 204, and may be classified as a particular type of event(s) by the event classifier 218. The resulting event file 210 may be stored using RAM 114, flash 115, and/or SSD 112, or other suitable memory.

The event file may be uploaded to the external network, based on the policy file (308). For example, the uploader 140 may operate according to relevant portions of the policy file 152 to upload the event file 210 to the remote processing resources 128. As described herein, the policy file 152 may dictate parameters of the upload queue 222 and related parameters, including an upload priority of the event file 210 with respect to other event files and/or other external conditions.

Figure 4:
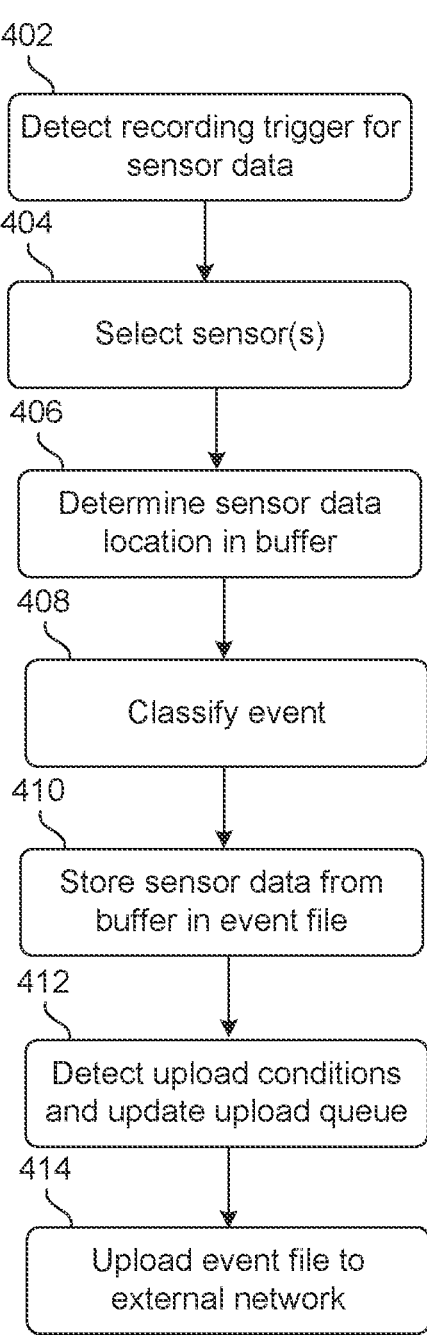
FIG. 4 is a flowchart illustrating more detailed examples of event file capture and processing in the systems of FIGS. 1 and 2.
Figure 5:
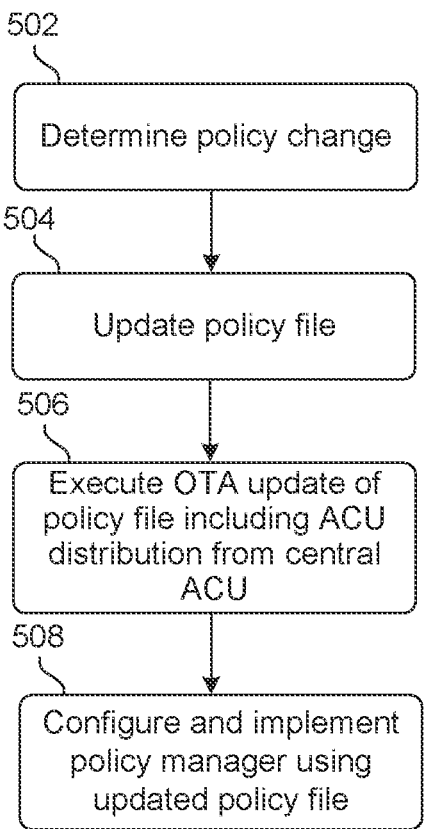
FIG. 5 is a flowchart illustrating more detailed examples of a process for dynamic OTA updates of a policy file and associated policy manager for event file capture and processing in the systems of FIGS. 1 and 2.

FIG. 4 is a flowchart illustrating more detailed examples of event file capture and processing in the systems of FIGS. 1 and 2. FIG. 5 is a flowchart illustrating more detailed examples of a process for dynamic OTA updates of a policy file and associated policy manager for event file capture and processing in the systems of FIGS. 1 and 2. In the example of FIGS. 4 and 5, various operations are illustrated as separate, sequential operations. In various implementations, however, the same or similar ones of the operations may include sub-operations, may be performed in a different order, may include alternative or additional operations, or may omit one or more operations. Further, in all such implementations, included operations may be performed in an iterative, looped, nested, or branched fashion.

In FIG. 4, while the sensor data stream 202 is being received, a recording trigger may be detected (402). A recording trigger may include any information that is internal or external to the vehicle 102, or combinations thereof. For example, a recording trigger may include a particular type or value of a sensor signal from one or more sensors, or combinations thereof, e.g., when the sensor values are outside of an expected range of values. A recording trigger may also include external, such as a weather event or information received via the external network 126.

In response to the recording trigger, one or more sensors may be selected for recording (404). For example, the policy file 152 may dictate that the particular recording trigger detected requires recording of sensor data from one or more of a particular type of sensor throughout the vehicle 102, or of a combination of sensors positioned at one or more particular location(s) around the vehicle 102.

Accordingly, for the sensor(s) identified, a corresponding sensor data location within buffers 204 may be determined (406). For example, referring to FIG. 2, if sensor A is associated with the recording trigger by the policy file 152, then the buffer location 206 within the buffers 204 may be identified for retrieval of relevant sensor data.

One or more potential event(s) may be classified, based on the determined sensor data (408). For example, the policy file 152 may relate specific sensor values or ranges to corresponding types of events, perhaps in combination with external factors obtained separately from the sensor data.

It will be appreciated that a recording trigger may be associated with one or more potential events, with varying strengths of correlation. For example, a recording trigger of a significant enough deceleration may be associated with a collision. In such cases, the recording trigger itself may be sufficient to classify an event.

In other examples, a recording trigger may indicate merely a potential for one or more types of events, such as a sudden vehicle movement that could relate to either a driver error and/or poor weather conditions. Therefore, it may not be feasible to classify a potential event until after corresponding sensor data is obtained and analyzed.

Sensor data from the buffer(s) 204 may be stored in an event file, e.g., the event file 210 (410). For example, a suitable format and/or compression type may be selected. In other examples, based on the type of event classified, a corresponding duration of sensor data may be retrieved. For example, a particular type of event for a recording trigger at time "t" may require collection of a prior 30 seconds (t–30) of sensor data, together with a subsequent 60 seconds (t+60) of sensor data, or until any designated end time is reached.

In some implementations, the resulting sensor data obtained may be stored initially in RAM 114 and then stored to SSD 112 for storing the recorded files 146. For example, the buffers 204 may record a first duration of sensor data, but various events may require storing at least a second duration of sensor data that is larger than the first duration.

For example, the buffers 204 may store 30 seconds or 60 seconds of sensor data, or some other maximum quantity, in a first-in-first-out (FIFO) or circular manner, so that (once a maximum size of the buffer(s) is reached) oldest data is deleted when new data is received. However, event data may require 90 seconds of sensor data, so that the recorder 144 may capture, e.g., an available 30 seconds of sensor data from the buffers 204 and then continue to capture a subsequent 60 seconds to obtain the total of 90 seconds of sensor data require for storage within the event file 210.

Upload conditions may be detected and the upload queue may be updated (412). For example, the policy file 152 may designate a priority level for uploading the type of event associated with the event file 210. The priority level may also be contingent on the type or strength of available connection to the external network 126.

The event file may then be uploaded to the external network (414). For example, the event file 210 may be uploaded via the TCU 124 to the external network 126, and thereby to the remote processing resources 128.

In the example of FIG. 5, example processes for dynamic OTA updates of a policy file 152 and associated policy manager 150 are illustrated. For example, a policy change may be determined (502). For example, a change to a recording trigger and/or an event classification algorithm may be determined. In other examples, a new and/or additional sensor data may become available, such as when a sensor 118 receives an update.

For example, a policy change may be determined at the remote processing resources 128, and an existing policy file may be updated (504). Accordingly, an OTA update of the policy file 152 may be executed (506). For example, the TCU 124 and the OTA updater 138 may download the new policy file, or portions thereof. For example, the TCU 124 may provide the policy file update through the internal network 116 to the ACU 122 as a central ACU of a plurality of ACUs, and relevant portions of the new policy file 152 may be distributed to appropriate ones of the remaining ones of the plurality of ACUs. For example, a particular ACU associated with a type of sensor (e.g., camera, or lidar sensor) may receive policy file portions associated with relevant sensor types.

The policy manager 150 may thus be configured and updated with the updated policy file (508). Advantageously, as described herein, it is not necessary to replace or update any one or more of the event manager 142, recorder 144, or uploader 140 in order to provide such policy changes. As noted herein, the event manager 142, recorder 144, or uploader 140 may be implemented using large binary files and/or libraries that may be impractical or infeasible to update OTA. Using the techniques described herein, however, the policy file 152 of the policy manager 150 may be updated using much smaller code portions that are suitable for OTA updates, so that the event manager 142, recorder 144, or uploader 140 may each be updated (separately or together) in a fast, efficient, and cost-effective manner.

Thus, described techniques enable efficient, optimal, policy-based use of available vehicle resources, e.g., while driving occurs, so that sensor data may be captured, e.g., for training and product development purposes. Data recording and uploading are configurable, so that a change in requirements is associated with a change in a configuration file. Accordingly, just by changing parameters of data collection logic (e.g., sensor selection, duration, priority start time, or end time), it is possible to conserve processor, memory, storage, and/or bandwidth resources.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

receive a policy file, over an external network, at a vehicle outfitted with a plurality of sensors, the policy file governing a policy for capturing and uploading sensor data from at least one of the plurality of sensors characterizing a driving event of the vehicle, wherein the policy file is a configuration file that defines policy parameters for capturing and uploading sensor data;

execute an over the air (OTA) update of a policy manager installed at the vehicle to install the policy file, wherein the policy manager is an application-layer software module that parses the policy file and dynamically applies the policy parameters to control operations of an event manager, a recorder, and an uploader, the policy manager being configured to analyze the sensor data to detect and capture a subset of the sensor data related to the driving event, using the event manager and based on the policy file;

record the subset of the sensor data in an event file using the recorder and based on the policy file; and upload the event file to the external network, using the uploader and based on the policy file.

2. The computer program product of claim 1, wherein the instructions, when executed, are configured to cause the at least one computing device to:

store the sensor data in at least one random access memory (RAM).

3. The computer program product of claim 2, wherein the instructions, when executed, are configured to cause the at least one computing device to:

store the sensor data in a circular buffer having a maximum size; and delete oldest-stored sensor data from the circular buffer when the maximum size is reached and new sensor data is added.

4. The computer program product of claim 2, wherein the instructions, when executed, are configured to cause the at least one computing device to:

detect a recording trigger, based on the policy file, that initiates recording of the subset of sensor data from the RAM to a second memory.

5. The computer program product of claim 4, wherein the instructions, when executed, are configured to cause the at least one computing device to:

select, in response to the recording trigger and based on the policy file, at least one sensor from which to record the subset of sensor data; and designate a start time and end time of recording of the subset of sensor data.

6. The computer program product of claim 5, wherein the instructions, when executed, are configured to cause the at least one computing device to:

designate the start time as occurring prior to the recording trigger;

capture, from the RAM, a first portion of the subset of sensor data recorded prior to the recording trigger; and capture a second portion of the subset of sensor data recorded in the RAM after the recording trigger, until the end time is reached.

7. The computer program product of claim 4, wherein the instructions, when executed, are configured to cause the at least one computing device to:

identify the recording trigger as including a sensor value of a first sensor of the plurality of sensors;

identify, in response to the recording trigger and based on the policy file, at least a second sensor of the plurality of sensors; and include sensor data from the first sensor and the at least the second sensor within the subset of sensor data.

8. The computer program product of claim 2, wherein the instructions, when executed, are configured to cause the at least one computing device to:

store first sensor data of a first sensor type from a first sensor at a first location within the RAM that is designated for the first sensor at a start of the vehicle; and store second sensor data of a second sensor type from a second sensor at a second location within the RAM that is designated for the second sensor type at the start of the vehicle.

9. The computer program product of claim 1, wherein instructions, when executed, are configured to cause the at least one computing device to:

classify the subset of sensor data as an event type, based on the policy file.

10. The computer program product of claim 1, wherein the instructions, when executed, are configured to cause the at least one computing device to:

compress the subset of sensor data, based on the policy file;

designate the compressed subset of sensor data within an upload queue, based on the policy file; and upload the compressed subset of sensor data to the external network, based on the upload queue.

11. A computer-implemented method, comprising:

receiving a policy file, over an external network, at a vehicle outfitted with a plurality of sensors, the policy file governing a policy for capturing and uploading sensor data from at least one of the plurality of sensors characterizing a driving event of the vehicle, wherein the policy file is a configuration file that defines policy parameters for capturing and uploading sensor data;

executing an over the air (OTA) update of a policy manager installed at the vehicle to install the policy file, wherein the policy manager is an application-layer software module that parses the policy file and dynamically applies the policy parameters to control operations of an event manager, a recorder, and an uploader, the policy manager being configured to analyze the sensor data to detect and capture a subset of the sensor data related to the driving event, using the event manager and based on the policy file;

recording the subset of the sensor data in an event file using the recorder and based on the policy file; and uploading the event file to the external network, using the uploader and based on the policy file.

12. The method of claim 11, comprising:

storing the sensor data in at least one random access memory (RAM).

13. The method of claim 12, comprising:

storing the sensor data in a circular buffer having a maximum size; and deleting oldest-stored sensor data from the circular buffer when the maximum size is reached and new sensor data is added.

14. The method of claim 12, comprising:

detecting a recording trigger, based on the policy file, that initiates recording of the subset of sensor data from the RAM to a second memory.

15. The method of claim 14, comprising:

selecting, in response to the recording trigger and based on the policy file, at least one sensor from which to record the subset of sensor data; and designating a start time and end time of recording of the subset of sensor data.

16. The method of claim 15, comprising:

designating the start time as occurring prior to the recording trigger;

capturing, from the RAM, a first portion of the subset of sensor data recorded prior to the recording trigger; and capturing a second portion of the subset of sensor data recorded in the RAM after the recording trigger, until the end time is reached.

17. The method of claim 14, comprising:

identifying the recording trigger as including a sensor value of a first sensor of the plurality of sensors;

identifying, in response to the recording trigger and based on the policy file, at least a second sensor of the plurality of sensors; and including sensor data from the first sensor and the at least the second sensor within the subset of sensor data.

18. A vehicle comprising:

a chassis;

a frame mounted on the chassis;

a motor mounted within the frame;

a plurality of sensors mounted on the vehicle;

at least one memory including instructions; and at least one processor that is operably coupled to the at least one memory and that is arranged and configured to execute instructions that, when executed, cause the at least one processor to:

receive a policy file, over an external network, at a vehicle outfitted with a plurality of sensors, the policy file governing a policy for capturing and uploading sensor data from at least one of the plurality of sensors characterizing a driving event of the vehicle, wherein the policy file is a configuration file that defines policy parameters for capturing and uploading sensor data;

execute an over the air (OTA) update of a policy manager installed at the vehicle to install the policy file, wherein the policy manager is an application-layer software module that parses the policy file and dynamically applies the policy parameters to control operations of an event manager, a recorder, and an uploader, the policy manager being configured to analyze the sensor data to detect and capture a subset of the sensor data related to the driving event, using the event manager and based on the policy file;

record the subset of the sensor data in an event file using the recorder and based on the policy file; and upload the event file to the external network, using the uploader and based on the policy file.

19. The vehicle of claim 18, wherein the instructions, when executed by the at least one processor, cause the at least one processor to:

detect a recording trigger, based on the policy file, that initiates recording of the subset of sensor data from a random access memory (RAM) to a second memory;

select, in response to the recording trigger and based on the policy file, at least one sensor from which to record the subset of sensor data; and designate a start time and end time of recording of the subset of sensor data.

20. The vehicle of claim 19, wherein the instructions, when executed by the at least one processor, cause the at least one processor to:

designate the start time as occurring prior to the recording trigger;

capture, from the RAM, a first portion of the subset of sensor data recorded prior to the recording trigger; and capture a second portion of the subset of sensor data recorded in the RAM after the recording trigger, until the end time is reached.

* * * * *